F. DOHERTY & W. J. ROBBINS.
PNEUMATIC TIRE.
APPLICATION FILED JUNE 7, 1910.
1,038,314.
Patented Sept. 10, 1912.
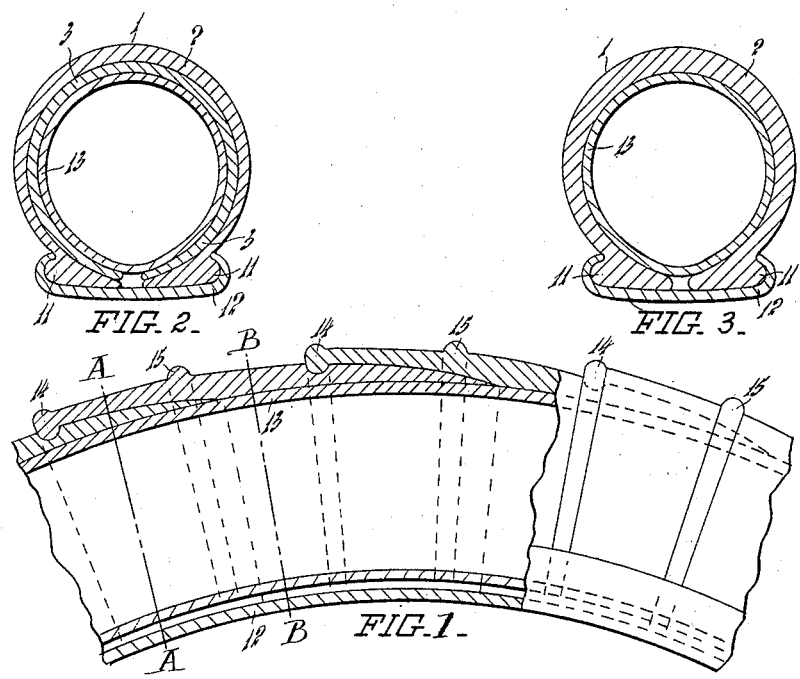

UNITED STATES PATENT OFFICE.

FRANK DOHERTY AND WILLIAM JOHN ROBBINS, OF WELLINGTON, NEW ZEALAND.

PNEUMATIC TIRE.

1,038,314.  Specification of Letters Patent.  Patented Sept. 10, 1912.

Application filed June 7, 1910. Serial No. 565,622.

*To all whom it may concern:*

Be it known that we, FRANK DOHERTY and WILLIAM JOHN ROBBINS, citizens of the Dominion of New Zealand, and both residing at Chilka street, Wellington, in the Provincial District of Wellington, in the Dominion of New Zealand, have invented certain new and useful Improvements in Pneumatic Tires, of which the following is a specification.

This invention relates to tires of motor cars, bicycles and the like, and provides an outer cover so constructed that a damaged portion may be readily and easily substituted by a new portion.

Difficulty is experienced at the present time in removing an outer cover from a motor car wheel, but our invention provides a cover which is removed with the greatest ease, and yet is quite secure when in operative position upon a wheel.

According hereto, the cover is made of a plurality of overlapping sections which surround the rim of the wheel and telescope into each other. When any section becomes worn or is otherwise damaged, it is immediately replaced by a spare section, a number of which are conveniently carried in a tool box, and thus the necessity for carrying a spare wheel is obviated.

The invention is illustrated in the accompanying drawing, and a detailed description will now be given by reference thereto.

Figure 1 is an elevation partly in section of part of a tire and wheel rim, Fig. 2 a cross sectional elevation on line A—A, Fig. 1; Fig. 3 a cross sectional elevation on line B—B, Fig. 1.

The cover made according to the invention comprises a number of similar sections each consisting of a body 2 and an integral apron 3, both made of rubber and canvas in the ordinary way. The free end of the body portion of each tire section terminates in a bead which projects from both the outer and inner surfaces of the section. The inwardly extending portion 4 of such terminal bead is adapted to fit within a groove formed in the exterior face of the adjacent section between the body portion 2 and apron 3. Each tire section is further provided with an exterior bead 15 and with longitudinal beads 11 adapted to fit the rim 12 of a wheel as usual. When the sections are assembled, as shown in Fig. 1, the body 2 of each section overlaps the apron 3 of the next section and is engaged with the rim of the wheel by its beads 11. The inner tube 13 and the air pressure therein hold the aprons against the interior of the bodies 2 and the beads 11 in engagement with the wheel rim. The several sections are interlocked by engagement of the beads 4 with the grooves provided therefor and the exterior beads 14, 15 act to make the tire "non-slipping." It will be seen that after deflating the inner tube any or all of the sections may be readily removed and others substituted.

Having thus described the invention what is claimed and desired to be secured by Letters-Patent is,

The herein described cover for pneumatic tires comprising a series of similar sections each including a body and an apron separated by an exterior groove, the apron member of each section extending into the body of the adjoining section and the latter having a terminal bead 14, projecting from both the outer and inner surfaces thereof, said inwardly projecting portion being adapted to engage the groove separating said apron member from its body member, and a second exterior bead 15.

In testimony whereof we affix our signatures in presence of two witnesses.

FRANK DOHERTY.
WILLIAM JOHN ROBBINS.

Witnesses:
ERNEST SMITH BALDWIN,
HENRY ASHTON HIGHET.

Copies of this patent may be obtained for five cents each, by addressing the "Commissioner of Patents, Washington, D. C."